US008053494B2

(12) United States Patent
Stovold et al.

(10) Patent No.: US 8,053,494 B2
(45) Date of Patent: Nov. 8, 2011

(54) INVISIBLE INK AND SCRATCH PAD

(75) Inventors: Terry W. Stovold, Raleigh, NC (US); JoAnn Domanski, Kennett Square, PA (US)

(73) Assignee: Nocopi Technologies, Inc., W. Conshohocken, PA (US)

( * ) Notice: Subject to any disclaimer, the term of this patent is extended or adjusted under 35 U.S.C. 154(b) by 973 days.

(21) Appl. No.: 11/972,600

(22) Filed: Jan. 10, 2008

(65) Prior Publication Data

US 2008/0113862 A1  May 15, 2008

Related U.S. Application Data

(63) Continuation-in-part of application No. 11/083,449, filed on Mar. 18, 2005, now abandoned, which is a continuation-in-part of application No. 10/942,246, filed on Sep. 15, 2004, now abandoned.

(60) Provisional application No. 60/509,281, filed on Oct. 6, 2003.

(51) Int. Cl.
*C09D 11/00* (2006.01)

(52) U.S. Cl. ........................................ 523/160; 523/161

(58) Field of Classification Search .................. 523/160, 523/161
See application file for complete search history.

(56) References Cited

U.S. PATENT DOCUMENTS

| RE24,899 | E | 11/1960 | Green |
|---|---|---|---|
| 3,429,827 | A | 2/1969 | Ruus |
| 3,575,882 | A | 4/1971 | Vandegaer et al. |
| 3,577,515 | A | 5/1971 | Vandegaer |
| 3,916,070 | A | 10/1975 | Ozutsumi et al. |
| 3,958,815 | A | 5/1976 | Poot et al. |
| 3,995,088 | A | 11/1976 | Garner et al. |
| 4,012,554 | A | 3/1977 | Miller et al. |
| 4,063,754 | A | 12/1977 | Shackle et al. |
| 4,087,284 | A | 5/1978 | Golden |
| 4,102,893 | A | 7/1978 | Garner et al. |
| 4,107,428 | A | 8/1978 | Farber |
| 4,112,138 | A | 9/1978 | Davis et al. |
| 4,119,776 | A | 10/1978 | Farber |
| 4,122,089 | A | 10/1978 | Kimura et al. |
| 4,132,436 | A | 1/1979 | Ishige et al. |
| 4,143,890 | A | 3/1979 | Davis et al. |
| 4,147,830 | A | 4/1979 | Kato et al. |
| 4,168,378 | A | 9/1979 | Schmidt et al. |
| 4,170,483 | A | 10/1979 | Shackle et al. |
| 4,189,171 | A | 2/1980 | Crounse et al. |
| 4,197,346 | A | 4/1980 | Stevens |
| 4,199,619 | A | 4/1980 | Oda et al. |
| 4,200,313 | A | 4/1980 | Schmidt et al. |
| 4,203,619 | A | 5/1980 | Sanders |
| 4,210,345 | A | 7/1980 | Kosche |
| 4,211,436 | A | 7/1980 | Kuhlthau |
| 4,219,219 | A | 8/1980 | Sato et al. |
| 4,233,223 | A | 11/1980 | Seibert |
| 4,251,446 | A | 2/1981 | Crounse et al. |
| 4,254,032 | A | 3/1981 | Petitpierre et al. |
| 4,275,005 | A | 6/1981 | Petitpierre et al. |
| 4,275,206 | A | 6/1981 | Becket et al. |
| 4,275,905 | A | 6/1981 | Miller |
| 4,295,662 | A | 10/1981 | Tutty |
| 4,309,213 | A | 1/1982 | Graber et al. |
| 4,323,700 | A | 4/1982 | Kondo et al. |
| 4,339,275 | A | 7/1982 | Tutty |
| 4,370,370 | A | 1/1983 | Iwata et al. |
| 4,388,362 | A | 6/1983 | Iwata et al. |
| 4,424,245 | A | 1/1984 | Murata et al. |
| 4,455,435 | A | 6/1984 | Dundon et al. |
| 4,483,606 | A | 11/1984 | Kuwako |
| 4,525,588 | A | 6/1985 | Zink |
| 4,533,930 | A | 8/1985 | Shioi et al. |
| 4,668,790 | A | 5/1987 | Bedekovic et al. |
| 4,783,196 | A | 11/1988 | Eckstein et al. |
| 4,822,768 | A | 4/1989 | Ohga et al. |
| 4,839,335 | A | 6/1989 | Ellis |
| 4,859,650 | A | 8/1989 | Hilterhaus et al. |
| 4,876,290 | A | 10/1989 | Vivant |
| 4,897,223 | A | 1/1990 | Eckstein et al. |
| 4,923,641 | A | 5/1990 | Eckstein et al. |
| 5,097,034 | A | 3/1992 | Eckstein et al. |
| 5,160,266 | A | 11/1992 | Landis |
| 5,215,956 | A | 6/1993 | Kawashima |
| 5,250,492 | A | 10/1993 | Dotson et al. |
| 5,330,566 | A | 7/1994 | Copeland |
| 5,338,066 | A | 8/1994 | Gundjian |
| 5,354,723 | A | 10/1994 | Gundjian |
| 5,421,869 | A | 6/1995 | Gundjian et al. |
| 5,443,629 | A | 8/1995 | Saville et al. |
| 5,476,829 | A | 12/1995 | Taylor et al. |
| 5,485,792 | A | 1/1996 | Keyser et al. |
| 5,516,362 | A | 5/1996 | Gundjian et al. |
| 5,595,590 | A | 1/1997 | Belding et al. |
| 5,605,873 | A | 2/1997 | Chang |
| 5,670,446 | A | 9/1997 | Jubran et al. |
| 5,670,874 | A | 9/1997 | Miyazaki et al. |
| 5,786,509 | A | 7/1998 | Belding et al. |
| 5,811,367 | A | 9/1998 | Sheiham |
| 5,814,579 | A | 9/1998 | Dotson et al. |
| 5,883,043 | A | 3/1999 | Halbrook, Jr. et al. |
| 5,888,283 | A | 3/1999 | Mehta et al. |
| 5,941,572 | A | 8/1999 | Gundjian et al. |
| RE36,306 | E | 9/1999 | Gundjian |
| 6,086,966 | A | 7/2000 | Gundjian et al. |
| 6,114,281 | A | 9/2000 | Belding et al. |
| 6,152,449 | A | 11/2000 | Lenkoff |
| 6,358,432 | B1 | 3/2002 | Tomono et al. |
| 6,555,420 | B1 | 4/2003 | Yamazaki |
| 2003/0050191 | A1 | 3/2003 | Bhatt et al. |
| 2003/0087757 | A1 | 5/2003 | Kubota et al. |
| 2005/0075420 | A1 | 4/2005 | Stovold |
| 2005/0165131 | A1 | 7/2005 | Stovold |

FOREIGN PATENT DOCUMENTS

EP  610739 A1  8/1994

*Primary Examiner* — Edward Cain

(74) *Attorney, Agent, or Firm* — Weitzman Law Offices, LLC

(57) ABSTRACT

An invisible ink, a method for preparing an invisible ink, and an invisible ink product are disclosed herein. An invisible ink comprising a first ink combined with a second ink is applied to a print medium. The first ink comprises a color developer activator without a color former leuco dye and the second ink comprises a color former leuco dye without a color developer activator. The first ink is prepared with a polyvinyl alcohol binder, dispersant/surfactant, and a wetting agent. The second ink is prepared with a polyvinyl alcohol binder, grind aid, dispersant/surfactant and defoamer. Heat generated by rubbing and/or scratching the invisible ink on the print medium activates the color former leuco dye and activator to change the color on the printing medium.

84 Claims, 1 Drawing Sheet

US 8,053,494 B2

INVISIBLE INK AND SCRATCH PAD

CROSS REFERENCE TO RELATED APPLICATIONS

This application is a continuation-in-part of and claims priority to U.S. patent application Ser. No. 11/083,449, filed Mar. 18, 2005, which is a continuation-in-part of and claims priority to U.S. patent application Ser. No. 10/942,246, filed Sep. 15, 2004, which claims priority to U.S. provisional patent application Ser. No. 60/509,281, filed Oct. 6, 2003, all of which are incorporated herein by reference in their entirety.

FIELD

This application relates generally to ink compositions, and more particularly, to an improved invisible ink and scratch pad product incorporating the improved invisible ink.

BACKGROUND

Invisible inks, such as scratch inks, have been utilized on documents for anti-counterfeiting purposes and to create games and other entertainment items such as toys, puzzles and coloring books. A scratch ink includes any ink or material that produces a color change or color initiation by rubbing, scratching, wiping, applying pressure or other heat producing actions. An example of an invisible scratch ink is disclosed in U.S. Pat. No. Re. 36,306, the entire disclosure of which is incorporated herein by reference.

Invisible inks may include a color former leuco dye and an activator that display color upon the application of heat caused by friction associated with rubbing, scratching or wiping of the ink. Such invisible inks are sometimes encapsulated to prevent premature activation of the leuco dye, but the capsules are prone to rupture and cause premature color development during printing, packaging and transit.

In addition, when such invisible inks are produced in larger quantities to cover larger areas of the substrates, the invisible ink may have the undesirable tendency to clump, foam up or increase the probability of premature color development. To address this issue, the activator and leuco dye have been printed separately, one on top of the other, but such two station printing is not ideal because the color development via frictional heat (scratching or rubbing) has a tendency to smear or powder and is more costly to print due to the need for two stations. It has proven difficult to resolve this processing issue by the addition of processing aids since any solubility of the activator or leuco dye can produce premature color activation.

SUMMARY

An invisible ink, a method for preparing an invisible ink, and an invisible ink product are disclosed herein. The preferred invisible ink comprises a first ink combined with a second ink, which is applied to a print medium. The first ink comprises a color developer activator without a color former leuco dye and the second ink comprises a color former leuco dye without a color developer activator. The first and second inks are prepared with a combination of polyvinyl alcohol binder, grind aid, dispersant, wetting agent and/or defoamer that overcomes problems associated with invisible inks when manufactured with larger quantities and printed or coated on large print areas (e.g., approximately 25% to 100% of the substrate). Heat generated by rubbing and/or scratching the invisible ink on the print medium activates the color former leuco dye and activator to change the color on the printing medium.

In a preferred embodiment, a scratch pad incorporating an invisible ink is disclosed. The scratch pad comprises a plurality of sheets of paper arranged in a stack. Each sheet of paper has a top surface and a bottom surface. The bottom surface of each sheet having an adhesive applied to at least a portion thereof to releasably secure the sheets of paper to the stack. An invisible ink comprising a color developer activator and a color former leuco dye is applied to the top surface of each sheet so that heat generated by rubbing and/or scratching the invisible ink on the top surface of one of the sheets activates the color former leuco dye and activator to change the color on the sheet.

These and other advantages of the present disclosure will be apparent to those of ordinary skill in the art by reference to the following detailed description and the accompanying drawings.

DETAILED DESCRIPTION

Figure 1:
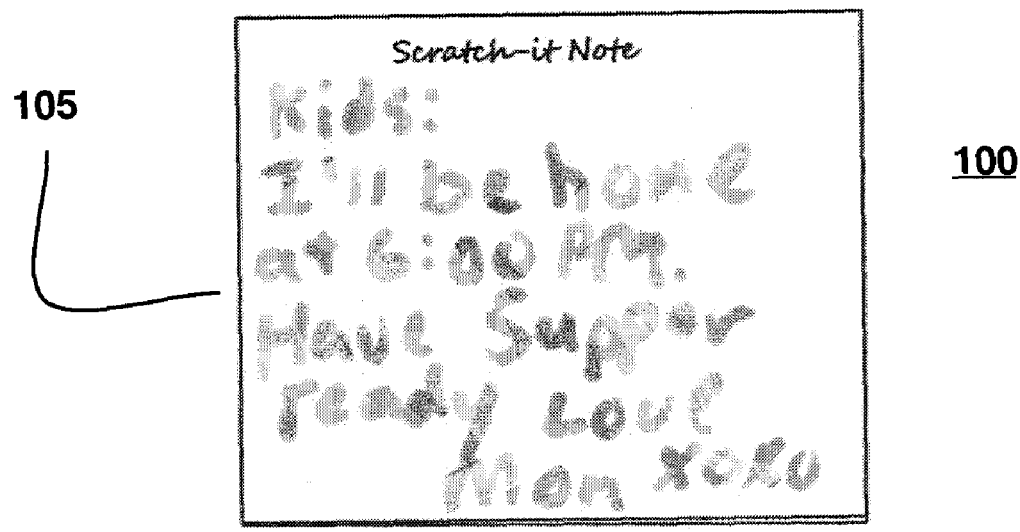
FIG. 1 is top plan view of a preferred note pad coated with the improved invisible ink.

An improved invisible ink is disclosed herein. The invisible ink may be utilized on documents for a variety of purposes, such as a security or anti-counterfeiting mechanism, to create games and other entertainment items, or to create notes on a document.

The improved invisible ink preferably includes two parts—a first part containing a color developer activator and a second part containing a color former leuco dye. These two parts may be combined into a water-based or oil-based ink prior to printing on, for example, a standard flexographic printing press or other conventional printing processes (e.g., gravure, stamping, coating, tint unit, lithographic, etc.). Once printed on a printing medium, the invisible ink dries and the leuco dye and activator materials will change the color of the printing medium upon the application of heat caused by friction associated with rubbing, scratching or wiping of the ink on the printing medium. Different colors may appear depending on the leuco dye in the ink.

Examples of color forming leuco dyes suitable for use with this disclosure include Copikem 14, Copikem Magenta 20, Copikem 6, Copikem 4 made by Hilton-Davis, Pergascript Orange I-5, Pergascript Red I-6B, Pergascript Green I-3G, Pergascript Yellow I-3R made by Ciga-Geigy, Reakt Red 448, Reakt Yellow 186 made by BASF, Specialty Magenta 20, Specialty Red 747, Specialty Black 34, Specialty Magenta 16, Specialty Orange 14, Specialty Blue 1, Specialty Yellow 37 by Emerald Hilton Davis, or other color formers whether or not synthetic organic coloring matter, either alone or in combination.

Examples of activators suitable for use with this disclosure include micronized D8 (4-hydroxy 4-isopropoxy diphenyl sulfone), Bisphenol A available from Sunoco, activating phenolic resins such as zincated, modified alkyphenol activator HRJ-10138, the Alkylphenol Novolac resin activator HRJ-2609 made by Schenectady Chemicals Inc., the chemical zinc chloride $ZnCl_2$, some bisphenols and hydroxybenzoates, either alone or in combination.

To facilitate production of larger quantities of the invisible ink, processing aids are preferably added to the first and second parts of the invisible ink. Such processing aids include dispersants/surfactants, grind agents, wetting agents and defoamers. Dispersants and surfactants have similar characteristics and are treated the same for purposes of this disclosure.

To avoid premature color activation, it is preferred that the processing aids do not solubilize the leuco dye or activator. Moreover, to avoid hydration of the activator (e.g., D8 (4-hydroxy 4-isopropoxy diphenyl sulfone)), it is preferred that the activator part of the two part ink be effectively dispersed with an appropriate dispersant/surfactant, that each particle be wet out using an appropriate wetting agent, that the particle size be maintained between 5-15 microns, and that the activator part of the ink be stored in a cool area (preferably between 50°-60° F.).

In a preferred embodiment, the activator is preferably wet micronized in water with a binder such as partially or fully hydroloyzed polyvinyl alcohol, an appropriate dispersant/surfactant, and an appropriate wetting agent to an appropriate particle size for the printing method to be utilized. Depending on the printing method, the particle size could be as high as 25-30 microns and as low as 1 micron or sub-micron. The activator particle size is preferably between five and 15 microns, which has been found to be a particularly effective size to avoid hydration of the activator.

In preparing the activator part of the ink prior to the micronizing process, it is preferred to mix the water, polyvinyl alcohol binder, dispersant/surfactant together in a drum using a high speed mixer before either the wetting agent or activator are added. The wetting agent is then added to the combined water, binder and dispersant and mixed with a high speed mixer for approximately five minutes. The activator is then slowly added to the combined water, binder, dispersant and wetting agent mixture and mixed with a high speed mixer for approximately 30-45 minutes. Alternatively, the wetting agent may be added after the water, binder, dispersant/surfactant and activator are combined together.

Similarly, in the preferred embodiment, the leuco dye is preferably wet micronized in water with a binder such as partially or fully hydroloyzed polyvinyl alcohol, dispersant/surfactant, grinding agent and defoamer, to an appropriate particle size for the printing method to be utilized. Again, depending on the printing method, the particle size could be as high as 25-30 microns and as low as 1 micron or sub-micron, but the particle size is preferably between five and ten microns.

An illustrative example of a two-part invisible ink is described below.

Part A Ink

An activator (e.g., D8 (4-hydroxy4-isopropoxy diphenyl sulfone)) is wet micronized in water, partially or fully hydrolyzed polyvinyl alcohol, a dispersant/surfactant and a wetting agent to a particle size of less than 15 microns. Preferably, the dispersant is an additive capable of dispersing inorganic pigments and solids with low foam, such as Surfynol® 104PG50 manufactured by Air Products and Chemicals, Inc. Preferably, the wetting agent is propylene glycol.

The following table sets forth the preferred weight percentage of the ingredients of the exemplary Part A Ink.

| INGREDIENTS | % (wt.) |
| --- | --- |
| D8 (4-hydroxy 4-isopropoxy diphenyl sulfone) | 32.20 |
| Water | 59.14 |
| Partially hydrolyzed polyvinyl alcohol | 6.96 |
| Dispersant | 0.70 |
| Wetting Agent | 1.00 |

Part B Ink

A leuco dye, for example, Specialty Magenta 20, 3, 3-Bis (1-butyl-2-methyl-1H-indol-3-yl)-1-(3H)-isobenzofuranone available from Emerald Hilton Davis in Cincinnati, Ohio is wet micronized in water, partially or fully hydrolyzed polyvinyl alcohol, grind aid, dispersant/surfactant and defoamer to a particle size of less than 10 microns with a mean around 6-7 microns. Preferably, the grind aid is a solvent-free, non-ionic/anionic grind aid designed for aqueous pigment wetting and dispersion, such as Surfynol® CT-131 manufactured by Air Products and Chemicals, Inc. A preferred dispersant is Surfynol® CT-324 manufactured by Air Products and Chemicals, Inc. Preferably, the defoamer is an oil free, non-silicone defoamer for aqueous systems, such as Surfynol® DF-75 manufactured by Air Products and Chemicals, Inc.

The following table sets forth the preferred weight percentage of the ingredients of the exemplary Part B Ink.

| INGREDIENTS | % (wt.) |
| --- | --- |
| Leuco dye | 35.0 |
| Water | 55.3 |
| Partially hydrolyzed polyvinyl alcohol | 6.0 |
| Grind Aid | 1.7 |
| Dispersant | 1.7 |
| Defoamer | 0.3 |

The two-part finish ink is preferably combined (mixed) at a ratio of weight of activator (Part A Ink) to leuco dye (Part B Ink) being from about 1:1 to about 8:1. Once printed, the water evaporates and the dry ingredients are left on the substrate or printing medium to be rubbed or scratched to a color change. The color change can vary depending on the leuco dye in the ink. The combined ink is preferably printed as soon as possible after the two parts (Part A and Part B) have been mixed. The shelf life of the ink can be increased to about three months if the two parts are mixed just prior to printing. If the two parts are already mixed, open ink should preferably be used immediately and unopened ink should preferably be used within a month of manufacture of the ink.

To assist printability and wetting, and for further protection against environmental factors such as temperature and high humidity on acidic or thermal substrates or any other substrate or surface, up to about 15% of wax may be added to the Part A and Part B combined ink. The wax may preferably be Joncryl 98 wax from Johnson Wax or any other suitable water-based or non-water based wax. Any wax dispersion, wax additive or other ingredient designed to withstand high humidity and temperature could possibly be useful, if it was compatible with scratch ink. The quantity of wax may vary, but is preferably from about 8% to about 12% (and most preferably 10%) by weight of the combined ink.

Preferably, the activator is from about 30% to about 40% by weight of the Part A ink and most preferably about 32.2%. Also, the leuco dye is preferably from about 30% to about 40% by weight of the Part B ink and most preferably about 35%.

The pH of the combined ink is preferably less than seven. One or more pH adjusters may be used to assure a desirable pH. A pH that is too low (acidic) may cause premature color development.

The Part A & Part B ink is printed, preferably immediately, on the appropriate printing medium, substrate or surface (preferably a pH neutral substrate). The new printed ink will rub or scratch to a color change and be less susceptible to premature coloring on acidic or thermal substrates than existing scratch inks.

Figure 2:
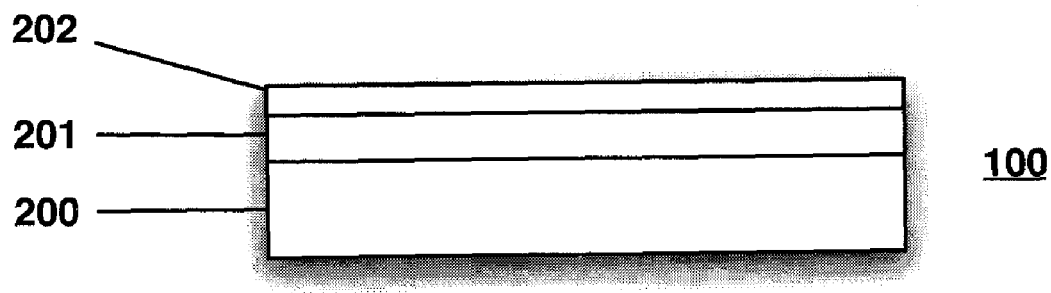
FIG. 2 is a side elevational view of the preferred note pad illustrated in FIG. 1.

Referring to FIGS. 1 and 2, there is shown an exemplary printing medium, such as a note pad 100, upon which the improved invisible ink disclosed herein may be printed or coated. The note pad 100 can be a single sheet of paper or the like, or multiple sheets assembled into a stack or pad. For example, the note pad 100 can be formed of multiple sheets 200 of paper or the like, with each sheet 200 being releasable from the pad, such as, for instance, using a pressure sensitive adhesive on a portion of the sheet or via tear perforations provided in the sheet.

Preferably, the entire surface of each sheet 200 of the note pad 100 is coated with a layer 201 of the invisible ink described herein. Sharp and clear text and drawings 105 can be created on the note pad 100 by rubbing or scratching the coated surface 201 of the note pad 100 with a writing tool (e.g., a stylus), fingernail or other hard object (not shown) such that frictional heat caused by the movement of the writing tool, fingernail, etc. over the coated surface causes the ink to change color to form the text or drawings 105. Thus, written notes and drawings 105 can be created on the coated sheet 200 without the need for a pen, pencil or other conventional writing instrument. The notes or drawings 105 preferably remain visible on the coated sheet 200 for several days, after which time, they preferably disappear and new notes or drawings can be created on the coated sheet 200. In the preferred embodiment, each coated sheet 200 may be used multiple times (e.g., three to four times) before the invisible ink coating no longer provides sharp and clear images. The sheet 200 may be discarded after that time. In the preferred embodiment, markings can also be created on the sheet 200 using a traditional pen or pencil.

To avoid powdering, a relatively thin layer or top coating 202 of wax or other suitable material may be applied over the layer invisible ink 201 on the printing medium 200. This top coating 202 is preferably a wax-based coating comprising approximately 50% by weight wax and 50% by weight water. The thickness of the top coating 202 is preferably approximately 10%-20% less than the thickness of the layer of invisible ink 201 applied to the printing medium 200.

The improved invisible ink described herein can also be used to create novel toys, puzzles, art products, educational, interactive customer verification products, novelty items and games, for example, tic-tac-toe, mazes, matching games, coloring books/pictures, quiz books, hang man games, connect the dots pictures and problem solving games, stickers, decorative items, art projects, gambling items/cards/tickets, etc. These can be implemented in any form. Examples include, placemats, cards, single pages of paper or pads of paper or other substrates, plastic films, labels, tags, stickers, various leathers or synthetic materials.

It is understood, however, that the improved invisible ink disclosed herein is not limited to interactive game applications and may be used as an anti-counterfeiting mechanism, to protect against illegal document duplication or as other security mechanisms. A simple rubbing action could verify the authenticity of the item.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A method of preparing an invisible ink that displays color in response to heat, comprising:
    preparing a first ink comprising a color developer activator without a color former leuco dye in an amount of from about 30% to about 40% by weight of the first ink, a binder in an amount of from about 2% to about 15% by weight of the first ink, one or more components selected from the group consisting of a dispersant and a wetting agent, the one or more components being present in an amount of from about 1% to about 5% by weight of the first ink, the remainder of the first ink being water;
    preparing a second ink comprising a color former leuco dye without a color developer activator in an amount of from about 30% to about 40% by weight of the second ink, a binder in an amount of from about 2% to about 15% by weight of the second ink, one or more components selected from the group consisting of a grind aid, a dispersant and a defoamer, the one or more components being present in an amount of from about 1% to about 5% by weight of the second ink, the remainder of the second ink being water; and
    combining the first and second inks prior to color development.

2. The method according to claim 1, wherein the activator is selected from the group consisting of phenolic resin, zinc chloride, bisphenol and hydroxybenzonate.

3. The method according to claim 1, wherein the activator is D8 (4-hydroxy 4-isopropoxy diphenyl sulfone).

4. The method according to claim 3, wherein the activator is present in the first ink in the amount of about 32% by weight of the first ink.

5. The method according to claim 1, wherein the binder is polyvinyl alcohol.

6. The method according to claim 1, wherein the binder is present in an amount from about 5% to about 7% by weight.

7. The method according to claim 6, wherein the binder is a partially hydrolyzed polyvinyl alcohol.

8. The method according to claim 6, wherein the binder is a fully hydrolyzed polyvinyl alcohol.

9. The method according to claim 1, wherein the wetting agent is propylene glycol.

10. The method according to claim 9, wherein propylene glycol is present in the first ink in an amount from about 0.1% to about 1.5% by weight.

11. The method according to claim 10, wherein propylene glycol is present in the first ink in an amount of about 1% by weight.

12. The method according to claim 1, wherein the grind aid is present in the second ink in the amount of about 1.7% by weight.

13. The method according to claim 1, wherein the dispersant is present in the first ink in the amount of about 0.5% to about 1.0% by weight.

14. The method according to claim 1, wherein the dispersant is present in the second ink in the amount of about 1.5% to about 2.0% by weight.

15. The method according to claim 1, wherein the dispersant is present in the first ink in the amount of about 0.7% by weight of the first ink and the dispersant is present in the second ink in the amount of about 1.7% by weight of the second ink.

16. The method according to claim 1, wherein the defoamer is present in the second ink in the amount of about 0.3% by weight.

17. The method according to claim 1, further comprising adding a wax to one or more of the inks selected from the group consisting of the first ink, second ink and combined ink, wherein the wax is present in the amount of up to about 15% by weight of the combined first and second inks.

18. The method according to claim 17, wherein the wax is present in the amount of about 10% by weight of the combined first and second inks.

19. The method according to claim 1, further comprising:
wet micronizing the first ink to a particle size of from about 5 microns to about 15 microns; and
wet micronizing the second ink to a particle size of from about 5 microns to about 10 microns.

20. An invisible ink that displays color in response to heat, comprising:
a first ink combined with a second ink;
the first ink comprising a color developer activator without a color former leuco dye in an amount of from about 30% to about 40% by weight of the first ink, a binder in an amount of from about 2% to about 15% by weight of the first ink, one or more components selected from the group consisting of a dispersant and a wetting agent, the one or more components being present in an amount of from about 1% to about 5% by weight of the first ink, the remainder of the first ink being water;
the second ink comprising a color former leuco dye without a color developer activator in an amount of from about 30% to about 40% by weight of the second ink, a binder in an amount of from about 2% to about 15% by weight of the second ink, one or more components selected from the group consisting of a grind aid, a dispersant and a defoamer, the one or more components being present in an amount of from about 1% to about 5% by weight of the second ink, the remainder of the second ink being water.

21. The invisible ink according to claim 20, wherein the activator is selected from the group consisting of phenolic resin, zinc chloride, bisphenol and hydroxybenzonate.

22. The invisible ink according to claim 20, where in the activator is D8 (4-hydroxy 4-isopropoxy diphenyl sulfone).

23. The invisible ink according to claim 22, wherein the activator is present in the first ink in the amount of about 32% by weight of the first ink.

24. The invisible ink according to claim 20, wherein the binder is polyvinyl alcohol.

25. The invisible ink according to claim 24, wherein the binder is present in an amount from about 5% to about 7% by weight.

26. The invisible ink according to claim 25, wherein the binder is a partially hydrolyzed polyvinyl alcohol.

27. The invisible ink according to claim 25, wherein the binder is a fully hydrolyzed polyvinyl alcohol.

28. The invisible ink according to claim 20, wherein the wetting agent is propylene glycol.

29. The invisible ink according to claim 28, wherein propylene glycol is present in the first ink in an amount from about 0.1% to about 1.5% by weight.

30. The invisible ink according to claim 29, wherein propylene glycol is present in the first ink in the amount of about 1% by weight.

31. The invisible ink according to claim 20, wherein the grind aid is present in the second ink in the amount of about 1.7% by weight.

32. The invisible ink according to claim 20, wherein the dispersant is present in the first ink in the amount of about 0.5% to about 1.0% by weight.

33. The invisible ink according to claim 20, wherein the dispersant is present in the second ink in the amount of about 1.5% to about 2.0% by weight.

34. The invisible ink according to claim 20, wherein the dispersant is present in the first ink in the amount of about 0.7% by weight and the dispersant is present in the second ink in the amount of about 1.7% by weight.

35. The invisible ink according to claim 20, wherein the defoamer is present in the second ink in the amount of about 0.3% by weight.

36. The invisible ink according to claim 20, further comprising wax in the amount of up to about 15% by weight of the combined first and second inks.

37. The invisible ink according to claim 36, wherein the wax is present in the amount of about 10% by weight of the combined first and second inks.

38. An invisible ink product comprising:
a print medium upon which an invisible ink has been applied;
the invisible ink comprising a first ink combined with a second ink;
the first ink comprising a color developer activator without a color former leuco dye in an amount of from about 30% to about 40% by weight of the first ink, a binder in an amount of from about 2% to about 15% by weight of the first ink, one or more components selected from the group consisting of a dispersant and a wetting agent, the one or more components being present in an amount of from about 1% to about 5% by weight of the first ink, the remainder of the first ink being water;
the second ink comprising a color former leuco dye without a color developer activator in an amount of from about 30% to about 40% by weight of the second ink, a binder in an amount of from about 2% to about 15% by weight of the second ink, one or more components selected from the group consisting of a grind aid, a dispersant and a defoamer, the one or more components being present in an amount of from about 1% to about 5% by weight of the second ink, the remainder of the second ink being water; and
wherein heat generated by rubbing and/or scratching the invisible ink on the print medium activates the color former leuco dye and activator to change the color on the printing medium.

39. The invisible ink product according to claim 38, wherein the activator is selected from the group consisting of phenolic resin, zinc chloride, bisphenol and hydroxybenzonate.

40. The invisible ink product according to claim 38, wherein the activator is D8 (4-hydroxy 4-isopropoxy diphenyl sulfone).

41. The invisible ink product according to claim 40, wherein the activator is present in the first ink in the amount of about 32% by weight of the first ink.

42. The invisible ink product according to claim 38, wherein the binder is polyvinyl alcohol.

43. The invisible ink product according to claim 42, wherein the binder is present in an amount from about 5% to about 7% by weight.

44. The invisible ink product according to claim 43, wherein the binder is a partially hydrolyzed polyvinyl alcohol.

45. The invisible ink product according to claim 43, wherein the binder is a fully hydrolyzed polyvinyl alcohol.

46. The invisible ink product according to claim 38, wherein the wetting agent is propylene glycol.

47. The invisible ink product according to claim 46, wherein propylene glycol is present in the first ink in an amount from about 0.1% to about 1.5% by weight.

48. The invisible ink product according to claim 47, wherein propylene glycol is present in the first ink in an amount of about 1% by weight.

49. The invisible ink product according to claim 38, wherein the grind aid is present in the second ink in the amount of about 1.7% by weight.

50. The invisible ink product according to claim 38, wherein the dispersant is present in the first ink in the amount of about 0.5% to about 1.0% by weight.

51. The invisible ink product according to claim 38, wherein the dispersant is present in the second ink in the amount of about 1.5% to about 2.0% by weight.

52. The invisible ink product according to claim 38, wherein the dispersant is present in the first ink in the amount of about 0.7% by weight and the dispersant is present in the second ink in the amount of about 1.7% by weight.

53. The invisible ink product according to claim 38, wherein the defoamer is present in the second ink in the amount of about 0.3% by weight.

54. The invisible ink product according to claim 38, further comprising wax in the amount of up to about 15% by weight of the combined first and second inks.

55. The invisible ink product according to claim 54, wherein the wax is present in the amount of about 10% by weight of the combined first and second inks.

56. The invisible ink product according to claim 38, wherein the print medium is a sheet of paper.

57. The invisible ink product according to claim 56, wherein the invisible ink is applied to an entire surface of the sheet of paper.

58. The invisible ink product according to claim 56, further comprising a plurality of sheets arranged in a stack, wherein the invisible ink is applied to an entire surface of each sheet.

59. The invisible ink product according to claim 56, wherein a coating of wax is applied over the invisible ink on the sheet of paper.

60. The invisible ink product according to claim 59, wherein the invisible ink on the sheet of paper and the coating of wax each have a thickness, the thickness of the wax coating being about 10% to about 20% less than the thickness of the invisible ink on the sheet of paper.

61. A scratch pad, comprising:
a plurality of sheets of paper arranged in a stack;
each sheet of paper having a top surface and a bottom surface;
the bottom surface of each sheet having an adhesive applied to at least a portion thereof to releasably secure the sheets of paper to the stack;
the top surface of each sheet having an invisible ink applied thereto, the invisible ink comprising a color developer activator and a color former leuco dye; and
wherein heat generated by rubbing and/or scratching the invisible ink on the top surface of one of the sheets activates the color former leuco dye and activator to change the color on the sheet.

62. The scratch pad according to claim 61, wherein the invisible ink comprises:
a first ink combined with a second ink;
the first ink comprising a color developer activator without a color former leuco dye in an amount of from about 30% to about 40% by weight of the first ink, a binder in an amount of from about 2% to about 15% by weight of the first ink, one or more components selected from the group consisting of a dispersant and a wetting agent, the one or more components being present in an amount of from about 1% to about 5% by weight of the first ink, the remainder of the first ink being water;
the second ink comprising a color former leuco dye without a color developer activator in an amount of from about 30% to about 40% by weight of the second ink, a binder in an amount of from about 2% to about 15% by weight of the second ink, one or more components selected from the group consisting of a grind aid, a dispersant and a defoamer, the one or more components being present in an amount of from about 1% to about 5% by weight of the second ink, the remainder of the second ink being water.

63. The scratch pad according to claim 62, wherein the activator is selected from the group consisting of phenolic resin, zinc chloride, bisphenol and hydroxybenzonate.

64. The scratch pad according to claim 61, wherein the activator is D8 (4-hydroxy 4-isopropoxy diphenyl sulfone).

65. The scratch pad according to claim 64, wherein the activator is present in the first ink in the amount of about 32% by weight of the first ink.

66. The scratch pad according to claim 62, wherein the binder is polyvinyl alcohol.

67. The scratch pad according to claim 66, wherein the binder is present in an amount from about 5% to about 7% by weight.

68. The scratch pad according to claim 67, wherein the binder is a partially hydrolyzed polyvinyl alcohol.

69. The scratch pad according to claim 67, wherein the binder is a fully hydrolyzed polyvinyl alcohol.

70. The scratch pad according to claim 62, wherein the wetting agent is propylene glycol.

71. The scratch pad according to claim 70, wherein propylene glycol is present in the first ink in an amount from about 0.1% to about 1.5% by weight.

72. The scratch pad according to claim 71, wherein propylene glycol is present in the first ink in an amount of about 1% by weight.

73. The scratch pad according to claim 62, wherein the grind aid is present in the second ink in the amount of about 1.7% by weight.

74. The scratch pad according to claim 62, wherein the dispersant is present in the first ink in the amount of about 0.5% to about 1.0% by weight.

75. The scratch pad according to claim 62, wherein the dispersant is present in the second ink in the amount of about 1.5% to about 2.0% by weight.

76. The scratch pad according to claim 62, wherein the dispersant is present in the first ink in the amount of about 0.7% by weight and the dispersant is present in the second ink in the amount of about 1.7% by weight.

77. The scratch pad according to claim 62, wherein the defoamer is present in the second ink in the amount of about 0.3% by weight.

78. The scratch pad according to claim 62, further comprising wax in the amount of up to about 15% by weight of the combined first and second inks.

79. The scratch pad according to claim 78, wherein the wax is present in the amount of about 10% by weight of the combined first and second inks.

80. The scratch pad according to claim 61, wherein a coating of wax is applied over the invisible ink on each sheet of paper.

81. The scratch pad according to claim 80, wherein the invisible ink on the top surface of each sheet of paper and the coating of wax each have a thickness, the thickness of the wax coating being about 10% to about 20% less than the thickness of the invisible ink on the sheet of paper.

82. The scratch pad according to claim 61, wherein a writing tool is used to rub or scratch the invisible ink on the top surface of one of the sheets to generate heat to change the color on the sheet.

83. The scratch pad according to claim 82, wherein the writing tool is a stylus.

84. The scratch pad according to claim 61, wherein a fingernail is used to rub or scratch the invisible ink on the top surface of one of the sheets to generate heat to change the color on the sheet.

* * * * *